F. M. PRETTYMAN.
MOTOR TRUCK.
APPLICATION FILED FEB. 15, 1913.
1,083,134.
Patented Dec. 30, 1913.
3 SHEETS—SHEET 1.
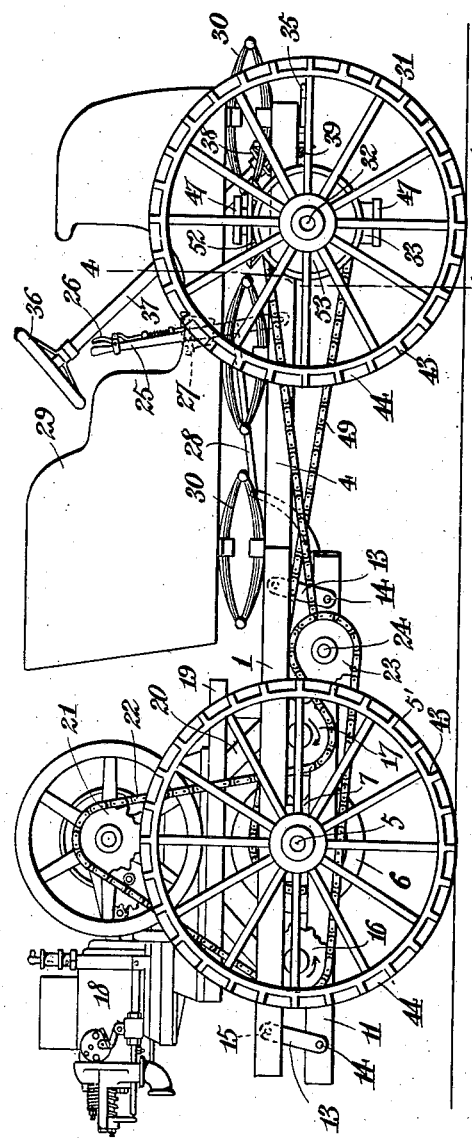
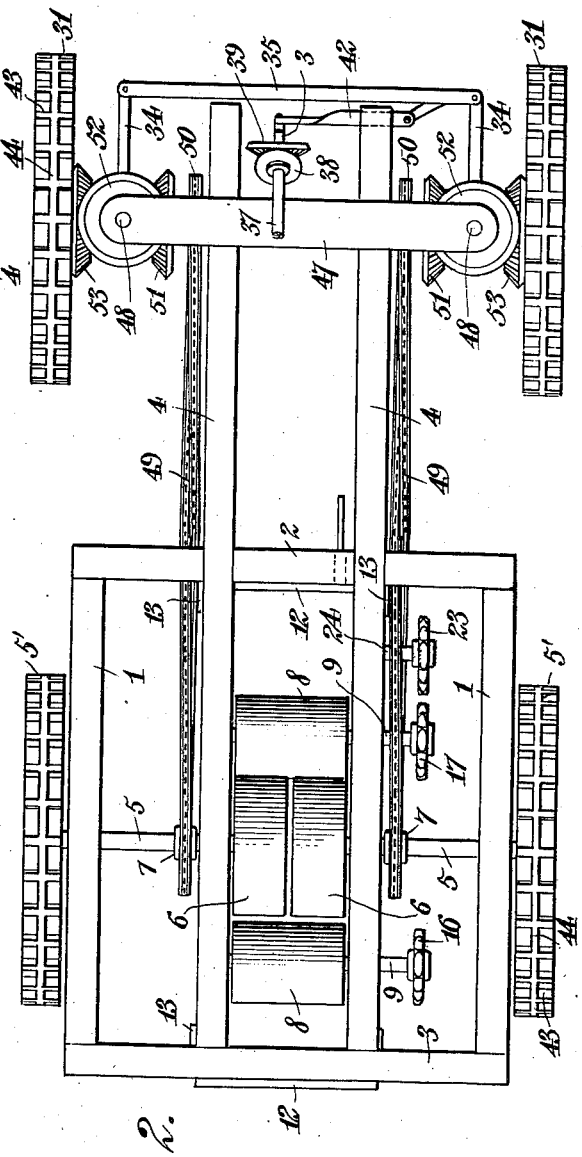
Inventor,
F. M. Prettyman.
By Victor J. Evans,
Attorney

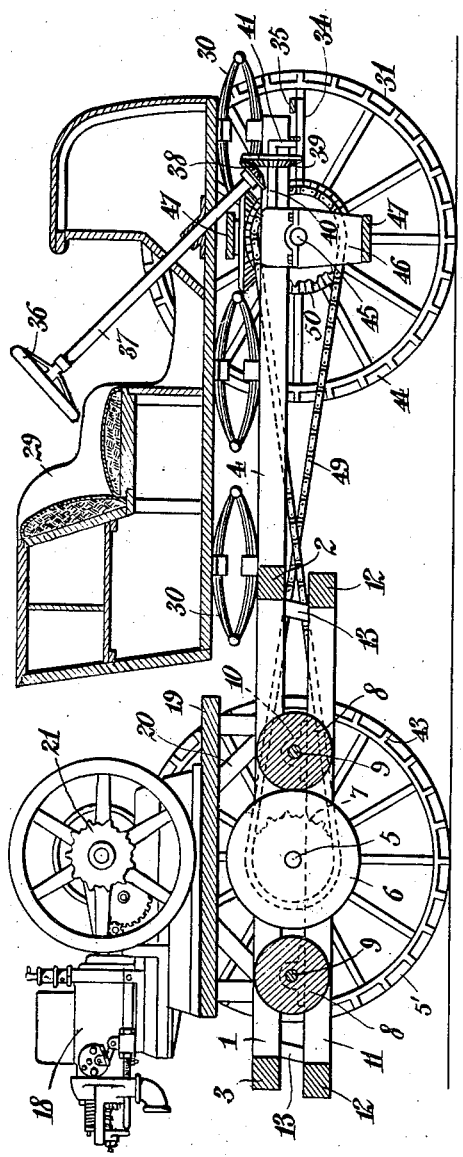
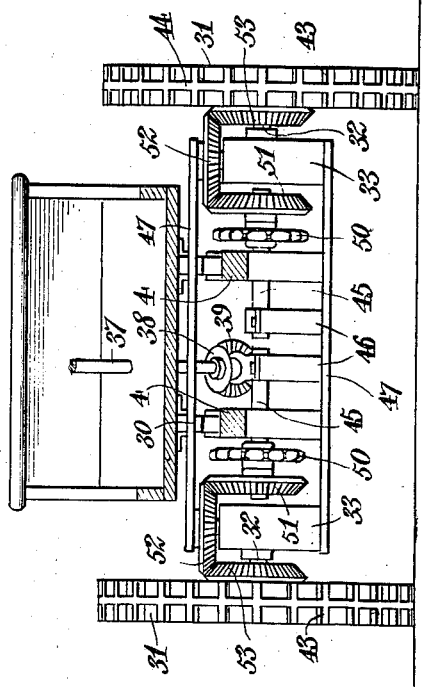

F. M. PRETTYMAN.
MOTOR TRUCK.
APPLICATION FILED FEB. 15, 1913.
1,083,134.
Patented Dec. 30, 1913.
3 SHEETS—SHEET 3.
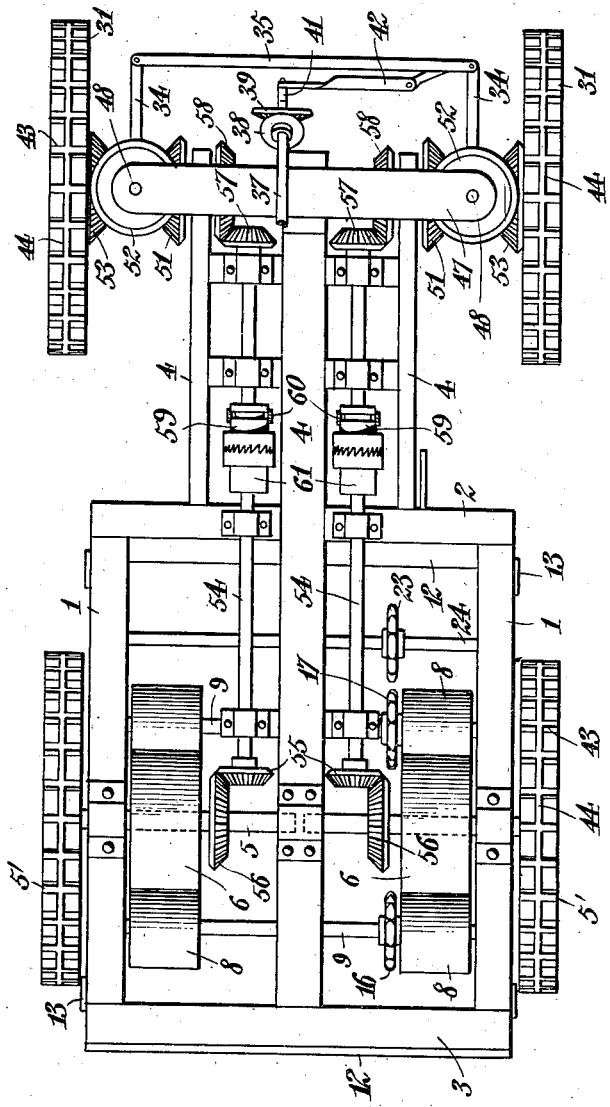
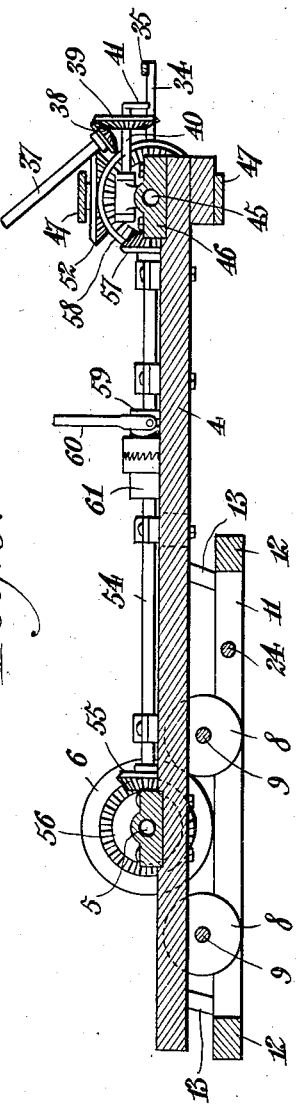

UNITED STATES PATENT OFFICE.

FRANCIS M. PRETTYMAN, OF MALLARD, MINNESOTA.

MOTOR-TRUCK.

1,083,134.  Specification of Letters Patent.  Patented Dec. 30, 1913.

Application filed February 15, 1913. Serial No. 748,704.

*To all whom it may concern:*

Be it known that I, FRANCIS M. PRETTYMAN, a citizen of the United States, residing at Mallard, in the county of Clearwater and State of Minnesota, have invented new and useful Improvements in Motor-Trucks, of which the following is a specification.

This invention relates to motor trucks, or mechanically propelled vehicles, the object in view being to provide a motor-driven vehicle which is susceptible of general use on the road and on the farm, the machine hereinafter particularly described being adapted to be driven by a motor of any desired power, and preferably of the internal combustion type, such as is now in common use, the general construction of the machine and arrangement of parts thereof being such that the machine may be used as a traction engine for hauling purposes, as a vehicle for travel, and as a portable engine for driving any desired machinery, such as wood saws, feed cutters, pumps, and the like, the machine as a whole being capable of production at small cost.

With the above and other objects in view, the invention consists in the construction, combination and arrangement of parts, as will be hereinafter more fully described, illustrated in the accompanying drawings, and pointed out in the claims hereunto appended.

In the drawings: Figure 1 is a side elevation of a motor truck, embodying the present invention. Fig. 2 is a plan view of the same, omitting the body and motor. Fig. 3 is a vertical longitudinal section through the machine. Fig. 4 is a vertical cross section on the line 4—4 of Fig. 1. Fig. 5 is a plan view of the machine with the body and motor removed, showing a shaft drive between the front and rear axle sections. Fig. 6 is a vertical longitudinal section through the same.

The machine contemplated in this invention comprises a truck frame, the preferred embodiment of which is illustrated in the plan view Fig. 2, in which it will be seen that said truck frame comprises a relatively wide rear portion, embodying the longitudinal side bars 1, and the front and rear cross bars 2 and 3, respectively. The forward portion of the frame is shown as formed by two parallel bars 4 arranged relatively closer together than the side bars 1 of the rear portion of the frame, the bars 4 being extended back to the rear cross bar 3, so as to form, in connection with the side bars 1, to which they are parallel, supports for the bearings for the sections of the rear driving axle. The rear driving axle is centrally divided into two sections 5 capable of rotating independently of each other, and having the rear driving wheels 5' mounted fast on the outer ends thereof outside of the main truck frame, hereinabove described. Fast on the inner ends of the shaft sections 5 are two friction wheels 6 which are preferably formed of cast iron, for a purpose which will hereinafter appear, the inner faces of the wheels 6 lying, by preference, close together, as shown in Fig. 2. Each of the shaft sections 5 is further provided with a sprocket wheel 7 fast thereon, for a purpose which will appear.

Located at opposite sides of both friction wheels 6, and preferably at the front and rear thereof, as illustrated in Fig. 2, are two friction rollers 8, preferably of compressed paper, each of said rollers being coextensive in length with the combined width of the two friction wheels 6, so that each of said friction driving rollers is adapted to impart motion to both of the friction wheels 6 simultaneously, while permitting one of the wheels 6 to slip when the machine is following a curved path, as in turning corners. The friction drive rollers 8 are mounted on shafts 9 journaled in bearings 10 on parallel bars 11 forming the side members of a shiftable transmission frame, comprising, in addition to the side bars 11, end cross bars 12, the frame being thus substantially rectangular in plan view.

The transmission frame as a whole is preferably underslung with respect to the parallel bars 4 of the main truck frame, as shown in Fig. 3, and the bearings 10 are so arranged as to locate the rollers 8 at a distance apart greater than the space occupied by the friction wheels 6, so that only one of the drive rollers 8 may be thrown into contact with the wheels 6 at a time for the purpose, as will hereinafter appear, of driving the machine forwardly or backwardly. The transmission frame is underslung by means of supporting pivotal links 13 which are pivotally connected to the transmission frame, at 14, and pivotally connected to the bars 4 of the main truck frame, at 15. The shaft 9 of the rear driving roller 8 has fast thereon a sprocket wheel 16, while the shaft of the other drive roller 8 has a corresponding sprocket wheel 17 fast thereon.

18 designates an internal combustion motor which is preferably mounted over the rear axle and supported at a suitable elevation by a frame 19 carried on posts 20. The motor 18 is provided with a sprocket wheel 21, around which passes a sprocket chain 22 which drives the sprocket wheels 16 and 17 in opposite directions, as indicated by the arrows in Fig. 1, said chain also passing around a reversing sprocket wheel 23 on a shaft 24 mounted in bearings on the underslung transmission frame, as shown in Fig. 3. One run of the chain 22 passes behind the sprocket wheel 16, thence forwardly under and upwardly over the sprocket wheel 23, thence under the sprocket wheel 17 and thence upwardly in rear of the sprocket wheel 17, over the sprocket wheel 21 of the motor. In this manner, the rollers 8 are simultaneously driven at equal speed in opposite directions, and when the underslung transmission frame is shifted in one direction, motion will be transmitted to the driving axle sections in a corresponding direction, and when the transmission frame is shifted in the opposite direction, motion will be imparted to the driving axle sections in the reverse direction. This enables the machine to be driven forwardly or backwardly, as may be desired, without reversing the motor, by simply shifting the transmission frame In order to shift the transmission frame for the purpose specified, a suitable hand-controlled lever 25 is arranged within convenient reach of the operator, said lever being provided with a thumb latch 26 engaging a rack 27, while a connection in the form of a rod 28 extends from the lever 25 back to the transmission frame. The driver may thus readily control the transmission frame, and the parts carried thereby, without moving from his position.

In front of the motor and supported on the forward portion of the truck frame is a suitable body 29, in which the operator sits, the same being shown as supported by a series of elliptical springs 30 interposed between the body and the truck frame.

The front steering wheels 31 are mounted on spindles 32 extending outwardly from and carried by a pair of steering knuckles 33 having lever arms 34 extending therefrom longitudinally of the machine, the arms 34 being coupled together for simultaneous and equal movement by means of a connecting rod 35 which insures the simultaneous turning of both steering wheels. The steering is controlled by a hand wheel 36, the column 37 of which is provided at its lower end with a pinion 38 which meshes with and turns a bevel gear wheel 39 fast on a short horizontal fore and aft shaft 40 mounted in suitable bearings at the front of the machine, and provided with a crank arm 41, from which a rod 42 extends to one of the arms 34. In this way, the operator may readily turn the steering wheels through the connections described.

All of the wheels 5' and 31 are provided with traction and anti-skid ribs 43 and 44, respectively, in order that all of said wheels may be used as traction or driving wheels, if needed. In order to impart motion to the forward wheels 31 and enable the same to revolve at the same speed as the rear driving wheels 5', which are of the same diameter, a divided or sectional front axle 45 has the sections thereof journaled in bearings 46 in a supplemental frame extending transversely to the direction of movement of the machine and consisting of top and bottom parallel bars 47, which are fixedly connected to the parallel bars 4, hereinabove referred to, and which are provided with bearings for the trunnions or pintles 48 at the upper and lower ends of the steering knuckles, as shown in Fig. 4.

Motion is imparted to the front axle sections 45 by means of sprocket chains 49 which extend from the sprocket wheels 7 on the rear axle sections around sprocket wheels 50 of corresponding size fast on the front axle sections 45. These sprocket chains 49 are given a twist or they are crossed as shown in Fig. 3, so as to drive the front axle sections in the opposite direction from the rear axle sections 5.

On the outer ends of each of the front axle sections 45 is fastened a bevel gear wheel 51 which meshes with another bevel gear wheel 52 journaled on the upper end of the adjacent steering knuckle, the wheel 52 in turn meshing with and driving another bevel gear wheel 53 which has a fixed relation to the adjacent steering wheel 31. The mechanism just described is, of course, duplicated with respect to each of the front steering wheels 31, so that both of said wheels, which are of the same diameter as the rear driving wheels, are simultaneously revolved at equal speeds, and it will also be observed that the turning of the steering wheels, in the operation of steering the machine to the right or left, will not interfere with the driving mechanism for imparting rotary motion to the front wheels.

In lieu of the driving connections between the front and rear axle sections, illustrated in Fig. 2, a shaft drive may be employed, as illustrated in Fig. 5. In said figure, 54 designates a pair of parallel shafts extending longitudinally of the machine and provided at their rear ends with bevel gear wheels 55 which mesh with and are driven by similar gear wheels 56 on the rear axle sections. Correspondingly, the shafts 54 are provided at their ends with bevel gear wheels 57 which mesh with and drive corresponding bevel gear wheels 58 on the front axle sections 45. At points intermediate their ends, the shafts 54 are provided with sliding clutches 59 operable by means of suitable clutch levers 60 fulcrumed on the machine frame or body, the clutches being movable into and out of engagement with other clutch members 61, whereby the forward portions of the shafts 54 may be disconnected from the rear portions thereof, for the purpose of throwing the front traction driving mechanism into and out of operation.

Under the arrangement illustrated in Fig. 2, the front driving mechanism may be thrown into and out of operation by any convenient mechanical expedient, such as clutches used in connection with the front sprocket wheels 50, or preferably in connection with the rear sprocket wheels 7, so as to lock said sprocket wheels to their shaft sections or unlock the same therefrom.

From the foregoing description, it will be seen that the machine as a whole is adapted for various kinds of work, whether used as a tractor for hauling or towing purposes, or used in a fixed position as a motive power for driving machines of all kinds. In the movement of the machine along the road or field, the traction driving mechanism associated with the rear driving axle acts in the additional capacity of a differential, by reason of the fact that one of the friction wheels 6 may slip on the driving roller in contact therewith, thus enabling the machine to be steered to one side or the other, without appreciable drag. It will also be seen that the machine may be driven by the front wheels in addition to the rear wheels, which will enable the machine to be extricated from soft places in the roadway, where it would be impracticable in case of the ordinary rear wheel drive, in event of the rear wheels becoming embedded in soft ground or mud. It will also be apparent that the machine may be quickly reversed and driven either forwardly or backwardly, as may be desired, by simply shifting a hand-controlled lever.

What is claimed is:

1. In a motor truck, the combination of a main truck frame, a divided rear driving axle journaled in said frame, traction wheels fast thereon, friction wheels fast on the inner ends of the sections of the rear axle, a transmission frame shiftable in a fore and aft direction relatively to the main truck frame, oppositely rotating friction drive rollers journaled in the transmission frame and located at opposite sides of both of said friction wheels, a motor geared to both friction rollers, and means for shifting said transmission frame and throwing said rollers alternately into and out of driving engagement with both friction wheels.

2. In a motor truck, the combination of a main truck frame, a divided rear driving axle journaled in said frame, traction wheels fast thereon, friction wheels fast on the inner ends of the sections of the rear axle, a link supported transmission frame shiftable in a fore and aft direction relatively to the main truck frame, oppositely rotating friction drive rollers journaled in the transmission frame and located at opposite sides of both of said friction wheels, a motor geared to both friction rollers, and means for shifting said transmission frame and throwing said rollers alternately into and out of driving engagement with both friction wheels.

3. In a motor truck, the combination of a main truck frame, a divided rear driving axle journaled in said frame, traction wheels fast thereon, friction wheels fast on the inner ends of the sections of the rear axle, a transmission frame shiftable in a fore and aft direction relatively to the main truck frame, oppositely rotating friction drive rollers journaled in the transmission frame and located at opposite sides of both of said friction wheels, sprocket wheels fast on the shafts of said rollers, a motor, a sprocket wheel on the motor, a chain transmitting motion from the motor sprocket wheel in reverse direction to said rollers, and means for shifting the transmission frame and throwing the friction drive rollers alternately into and out of engagement with both friction wheels.

4. In a motor truck, the combination of a main truck frame, a divided rear driving axle journaled in said frame, traction wheels fast thereon, friction wheels fast on the inner ends of the sections of the rear axle, a transmission frame shiftable in a fore and aft direction relatively to the main truck frame, oppositely rotating friction drive rollers journaled in the transmission frame and located at opposite sides of both of said friction wheels, a motor geared to both friction rollers, means for shifting said transmission frame and throwing said rollers alternately into and out of driving engagement with both friction wheels, front steering and traction wheels, and driving connections between the front and rear wheels.

5. In a motor truck, the combination of a main truck frame, a divided rear driving axle journaled in said frame, traction wheels fast thereon, friction wheels fast on the inner ends of the sections of the rear axle, a transmission frame shiftable in a fore and aft direction relatively to the main truck frame, oppositely rotating friction drive rollers journaled in the transmission frame and located at opposite sides of both of said friction wheels, a motor geared to both friction rollers, means for shifting said transmission frame and throwing said rollers alternately into and out of driving engagement with both friction wheels, a divided front axle, driving connections between the rear and front axle sections, front steering wheel knuckles, and steering wheels journaled on said knuckles and driven by bevel gearing from the front axle sections.

6. In a motor truck, the combination of a main truck frame, a divided rear driving axle journaled in said frame, traction wheels fast thereon, friction wheels fast on the inner ends of the sections of the rear axle, a transmission frame shiftable in a fore and aft direction relatively to the main truck frame, oppositely relating friction drive rollers journaled in the transmission frame and located at opposite sides of both of said friction wheels, a motor geared to both friction rollers, means for shifting said transmission frame, and throwing said rollers alternately into and out of driving engagement with both friction wheels, a divided front axle, driving connections between the rear and front axle sections, front steering wheel knuckles, steering wheels journaled on said knuckles and driven by bevel gearing from the front axle sections, and means for disconnecting the front and rear axles.

In testimony whereof I affix my signature in presence of two witnesses.

FRANCIS M. PRETTYMAN.

Witnesses:
   JULIUS W. KLEMANN,
   JACOB BOVEE.